United States Patent
Hale et al.

(10) Patent No.: US 8,950,956 B2
(45) Date of Patent: Feb. 10, 2015

(54) MULTI-FUNCTION RETRACTOR BODY, ADJUSTABLE STRAP, AND CAMERA MOUNTING SYSTEM USING SAME

(71) Applicant: DayMen US, Inc., Petaluma, CA (US)

(72) Inventors: Eric C. Hale, San Francisco, CA (US); Noah Balmer, Oakland, CA (US); David Ethan Yao, San Francisco, CA (US); Heidi Serene Farrell, San Francisco, CA (US); Fred Italo Polito, Santa Cruz, CA (US)

(73) Assignee: DayMen US, Inc., Petaluma, CA (US)

( * ) Notice: Subject to any disclaimer, the term of this patent is extended or adjusted under 35 U.S.C. 154(b) by 0 days.

(21) Appl. No.: 13/839,875

(22) Filed: Mar. 15, 2013

(65) Prior Publication Data

US 2014/0093230 A1    Apr. 3, 2014

Related U.S. Application Data

(60) Provisional application No. 61/622,527, filed on Apr. 11, 2012.

(51) Int. Cl.
*G03B 17/00* (2006.01)
*G03B 17/56* (2006.01)
*F16M 13/04* (2006.01)
*B65H 75/44* (2006.01)

(52) U.S. Cl.
CPC ............ *G03B 17/561* (2013.01); *G03B 17/563* (2013.01); *F16M 13/04* (2013.01); *B65H 75/4431* (2013.01)
USPC ........................................................ 396/423

(58) Field of Classification Search
CPC .... G03B 17/56; G03B 17/561; G03B 17/563; F16M 13/04; A45F 5/02
USPC .................. 396/419, 420, 423; 119/795–798; 248/320, 323, 328, 329
See application file for complete search history.

(56) References Cited

U.S. PATENT DOCUMENTS

2004/0016840 A1 * 1/2004 Malvini et al. ............. 242/379.2
2009/0255485 A1 * 10/2009 Dickie et al. .................. 119/794

\* cited by examiner

*Primary Examiner* — W B Perkey
*Assistant Examiner* — Minh Phan
(74) *Attorney, Agent, or Firm* — Michael A. Guth

(57) ABSTRACT

The present invention is directed towards a versatile retractable strap assembly adapted to mount to the bottom of a camera, or other device, and to be used in a variety of configurations. The strap resides in a retractor and is adapted to be used as a wrist strap or a neck strap, and the assembly may also be mounted onto a tripod.

2 Claims, 10 Drawing Sheets

MULTI-FUNCTION RETRACTOR BODY, ADJUSTABLE STRAP, AND CAMERA MOUNTING SYSTEM USING SAME

CROSS-REFERENCE TO RELATED APPLICATIONS

This application claims priority to U.S. Provisional Patent Application No. 61/622,527 to Hale, filed Apr. 11, 2012, which is hereby incorporated by reference in its entirety.

BACKGROUND

1. Field of the Invention

The present invention relates to a camera mounting and handling, and more specifically to a camera mount and adjustable strap.

2. Description of Related Art

Cameras may be handled by a user in a variety of ways, and may have different straps or tripod mounts attached depending upon the situation. In some uses, a short wrist strap may be used which adds security to holding the camera while photographing. In some uses, a longer strap may be used which allows the camera to be suspended from the neck of the user while not being used. In some uses, a user may want to mount the camera onto a tripod.

What is called for is a device which may function as a wrist strap, and also extend out to be a neck strap, for the support of a camera.

SUMMARY

The present invention is directed towards a versatile retractable strap assembly adapted to mount to the bottom of a camera, or other device, and to be used in a variety of configurations. The strap resides in a retractor and is adapted to be used as a wrist strap or a neck strap, and the assembly may also be mounted onto a tripod.

DETAILED DESCRIPTION

In some embodiments of the present invention, a camera strap and mounting system is adapted to support a device, such as a camera. The camera strap and mounting system may include a strap which is coupled to a retractor base 101. In some embodiments, a tripod mounting plate is adapted to mount to the bottom of the retractor base for quick installation to and removal from a tripod.

Figure 1:
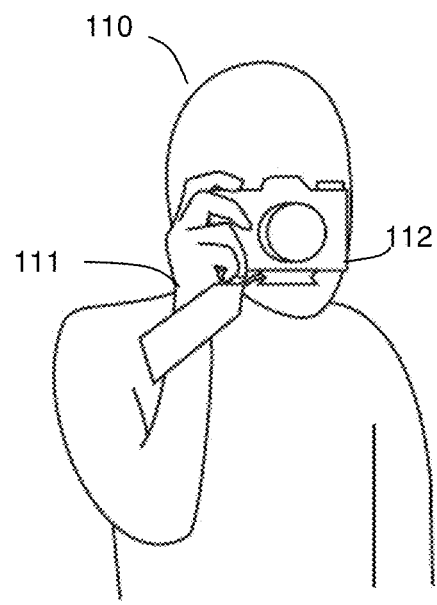
FIG. 1 illustrates a view of a camera strap and mounting system used as a wrist strap according to some embodiments of the present invention.

As seen if FIG. 1, the camera strap and mounting system allows for use as a wrist strap. A camera 112 may be used by a user 110 with the strap around the user's wrist 111. The strap is in a retracted position such that the strap is relatively short and adapted to be wrapped around the wrist, providing security to the user should the camera be let go. The camera would hang from the wrist via the wrist strap. A removable slide may be mounted on the retractor base which is adapted to be easily removed from the retractor base and slid up the strap in order to cinch up the strap more tightly around the user's wrist.

Figure 3:
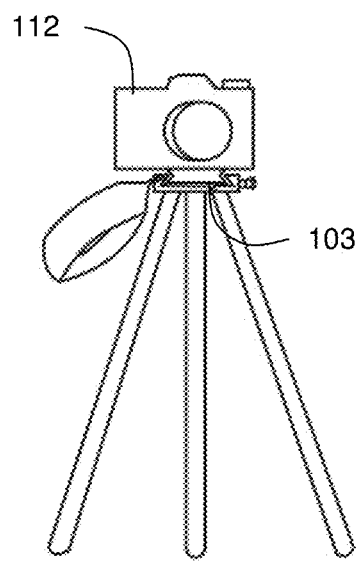
FIG. 3 illustrates a view of a camera strap and mounting system used with a tripod according to some embodiments of the present invention.

As seen if FIG. 3, the camera strap and mounting system allows for use as a neck strap. A camera 112 may be used by a user 110 with the strap around the user's neck and shoulders 113. The strap is in an extended position such that the strap is relatively long and adapted to be draped around the neck, providing security to the user should the camera be let go. The camera would hang from the neck via the neck strap. The retractor base may contain a cord reel adapted to allow for extension of cords which attach the strap to the retractor base. The retractor base may be adapted to have a locking aspect which allows the user to lock the cord reel such that the extended cords are locked into the selected length. The cord reel may be spring loaded such that when the locking aspect is released (unlocked), the cord retracts automatically. The cords may then be locked into the shorter retracted position.

Figure 2:
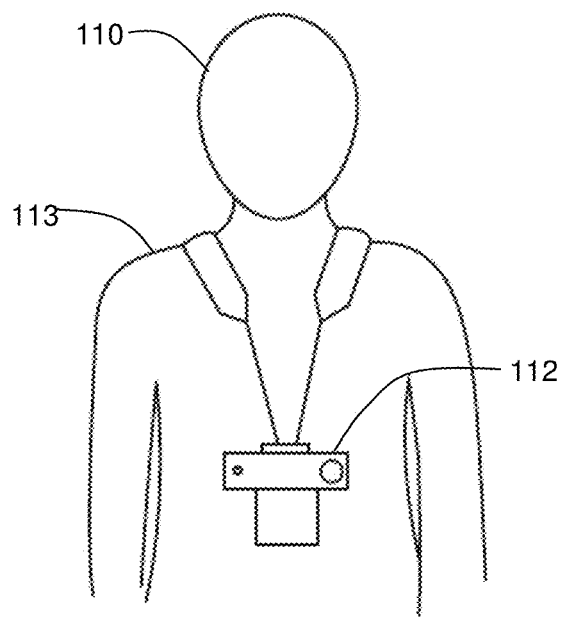
FIG. 2 illustrates a view of a camera strap and mounting system used as a neck strap according to some embodiments of the present invention.
Figure 4:
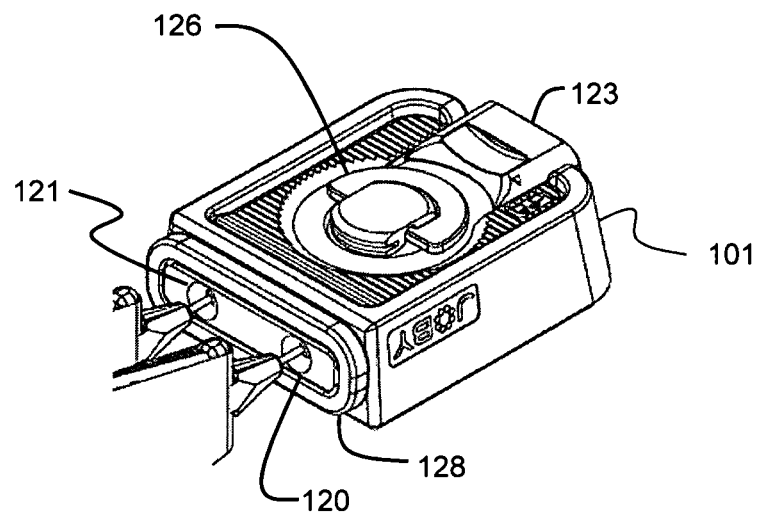
FIG. 4 illustrates a view of a strap retractor base according to some embodiments of the present invention.

As seen in Figure, the camera strap and mounting system also allows for the mounting of the camera 112 to a tripod with a tripod mounting plate 103 in some embodiments. As seen in FIGS. 2-4, the camera strap and mounting system allows the user to have a variety of configurations with a single system. The different strap configurations, as well as tripod mounting, address most, if not all, of the situations in which the user may desire to support the camera.

Figure 5:
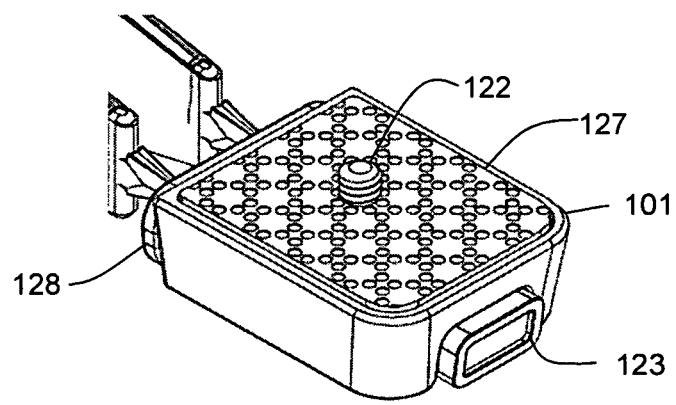
FIG. 5 illustrates a view of a strap retractor base according to some embodiments of the present invention.

FIGS. 4 and 5 illustrate top and bottom views, respectively, of a retractor base 101 adapted to mount to the bottom of a camera via a mounting screw 122. Portions of cords attached to a strap enter the retractor base via holes 120, 121 adapted to receive the cords. Within the retractor base 101 may be a spring loaded reel adapted to reel in the cord ends from an extended position of the strap, such as when the strap is used as a neck strap, to a retracted position, such as when the strap is used as a wrist strap. A lock 123 may be used to lock the strap at the desired length. An internal winding assembly may allow the strap to be pulled in onto a reel such that the retracted position may be attained.

Figure 15:
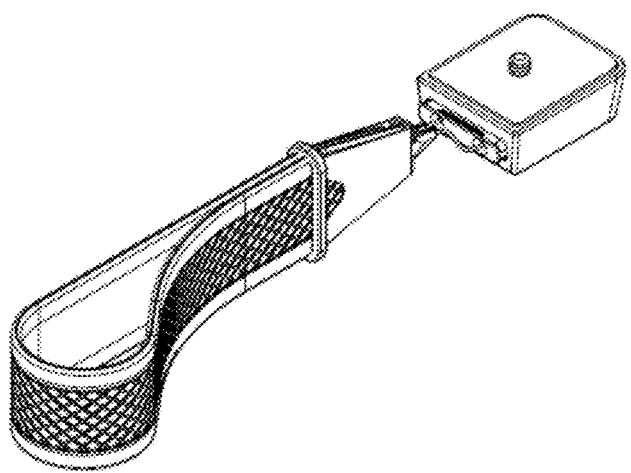
FIG. 15 is an illustration of a slide in use on a strap according to some embodiments of the present invention.

The surface 127 which would contact the camera may be of a somewhat compressible material which would enhance the attachment of the retractor base 101 to the camera. The mounting screw 122 may be tightened into the receptor in a camera with the use of a lever 126, which may be adapted to fold flat into a recess within the top surface of the retractor base. In some embodiments, the lever 126 may include a threaded recess adapted to receive the threaded post of a tripod, or tripod mount, allowing the retractor base to be mounted onto a tripod. A slide 128 may be mounted onto a receiver extending from the base. The slide is mounted such that the cords route through the slide, allowing the slide to be removed from the base and slid up the cords and then onto the strap. The slide may be of a resilient material and sized such that it provides sufficient compression on the two portions of the strap it surrounds that it cinches the strap into a shorter and tighter closed loop around the wrist of the user. The slide 128 being used to cinch the strap 130 is seen in FIG. 15.

Figure 6:
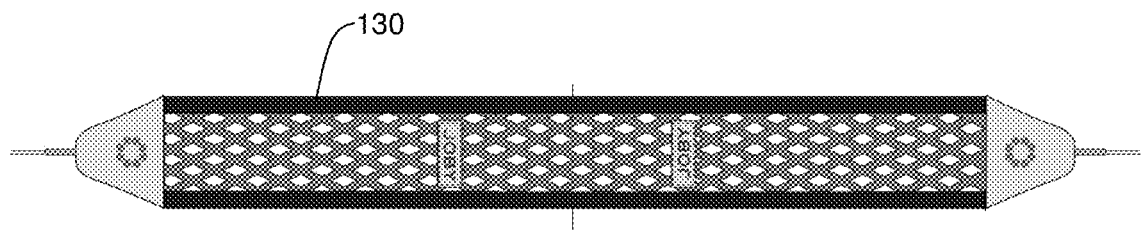
FIG. 6 illustrates a view of a strap according to some embodiments of the present invention.
Figure 7:
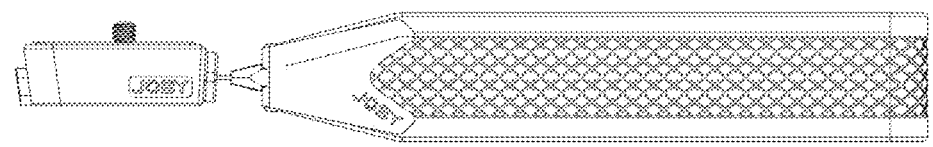
FIG. 7 illustrates a side view of a camera strap system according to some embodiments of the present invention.
Figure 8:
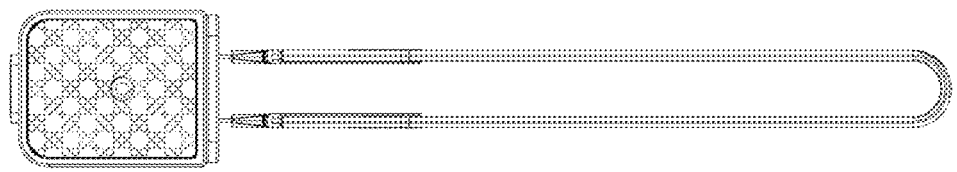
FIG. 8 illustrates a top view of a camera strap system according to some embodiments of the present invention.
Figure 9:
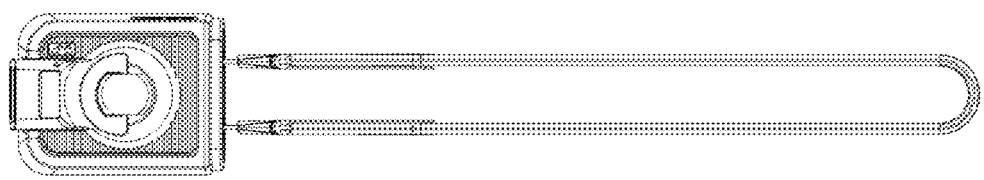
FIG. 9 illustrates a bottom view of a camera strap system according to some embodiments of the present invention.
Figure 10:
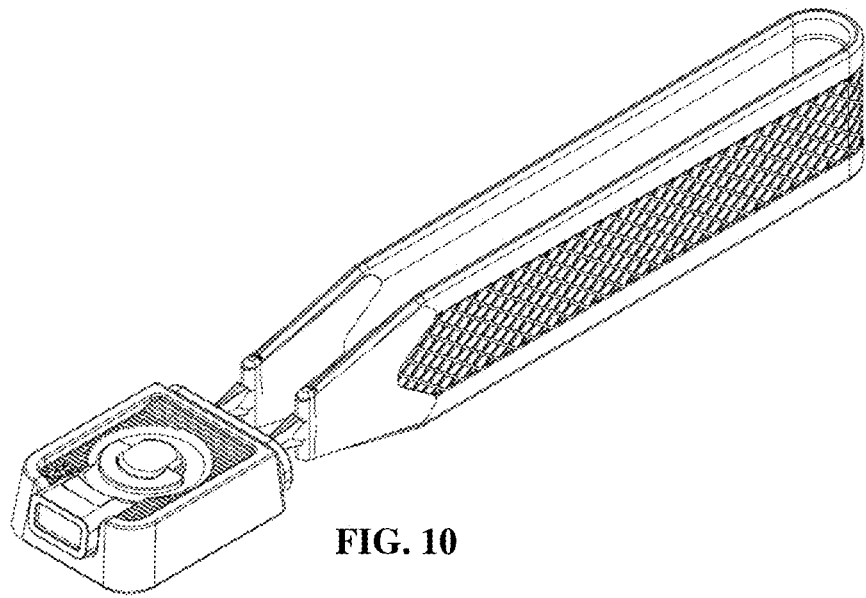
FIG. 10 is a perspective view of a camera strap system according to some embodiments of the present invention.
Figure 11:
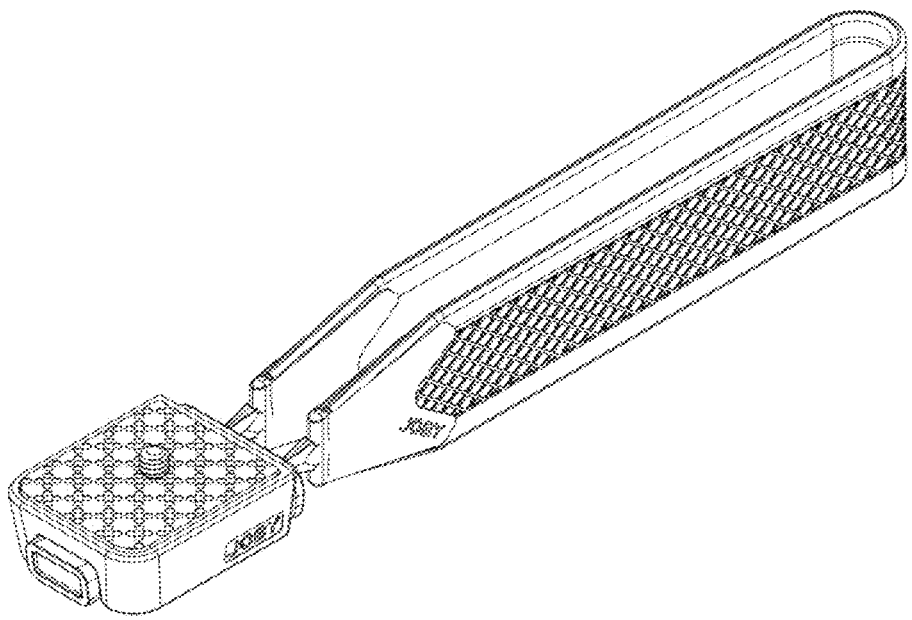
FIG. 11 is a perspective view of a camera strap system according to some embodiments of the present invention.

FIG. 6 illustrate a strap 130 according to some embodiments of the present invention. The strap 130 has cords 124, 125 attached to its ends.

FIGS. 7-11 illustrate a camera strap system 100 according to some embodiments of the present invention. These illustrations show the camera strap system 100 with the cords retracted such that the strap is in its shortest configuration, as when the camera strap system would be used as a wrist strap. The strap may be of a flexible material with sufficient strength to withstand the forces associated with supporting a camera in the scenarios described.

Figure 12:
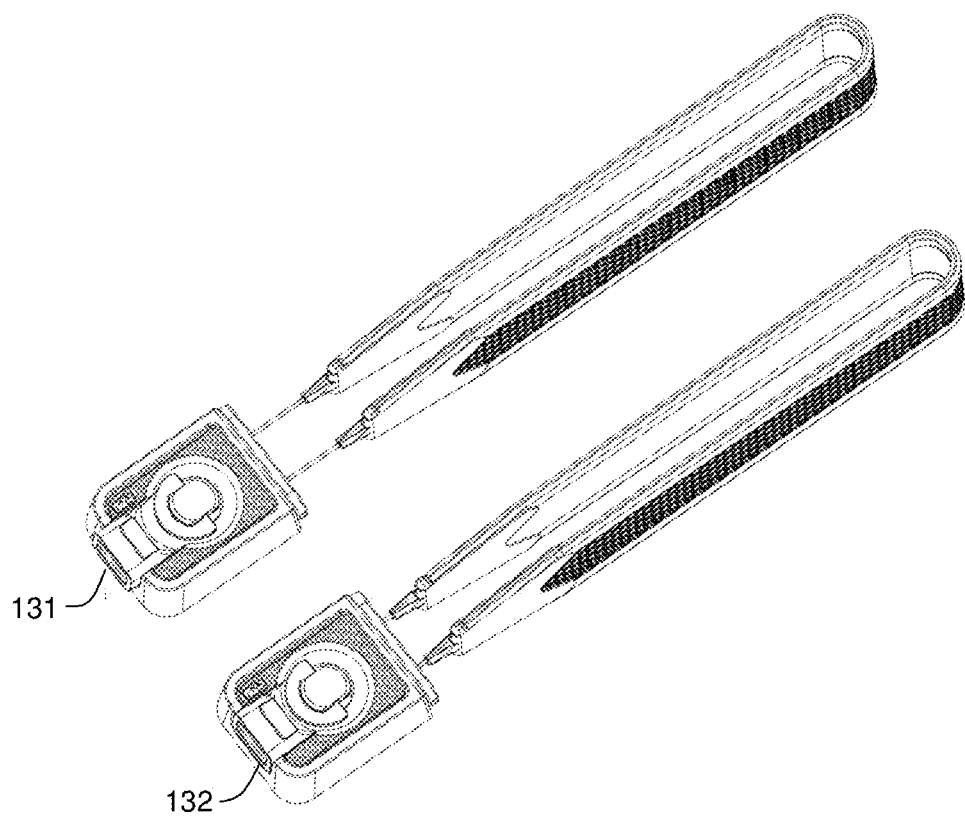
FIG. 12 is a perspective view of a camera strap system according to some embodiments of the present invention.
Figure 14:
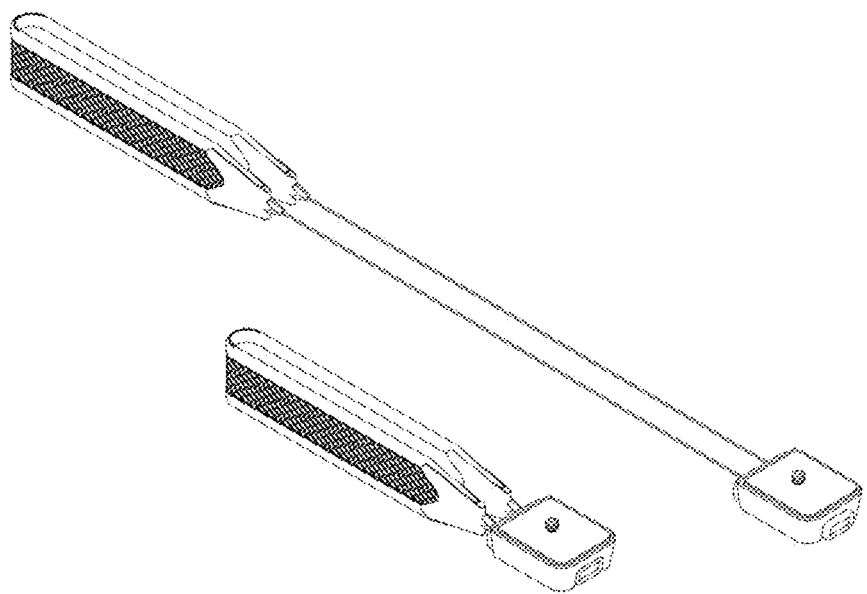
FIG. 14 is an illustration showing the strap assembly in a short and a long configuration.

FIG. 12 illustrates the lock 123 in a locked position 132 and an unlocked position 131. To extend the cords, and thus lengthen the effective strap length, the lock 123 would be pulled into the unlocked position 131. The cords may then be extended to a desired length. The lock 123 would then be pushed into the locked position 132. This method may be used to extend the camera strap system out to an effective strap length to be used as a neck strap, for example. To retract the cords, the lock 123 would be pulled into the unlocked position 131. The cords will retract themselves using a spring loaded mechanism within the retractor base 101. The lock 123 may then be pushed back into the locked position 132. This method may be used to retract the camera strap system down to an effective strap length to be used as a wrist strap, for example. The cords may be locked at any length between fully extended and fully retracted. The fully retracted and the fully extended configurations may be seen in FIG. 14.

Figure 13:
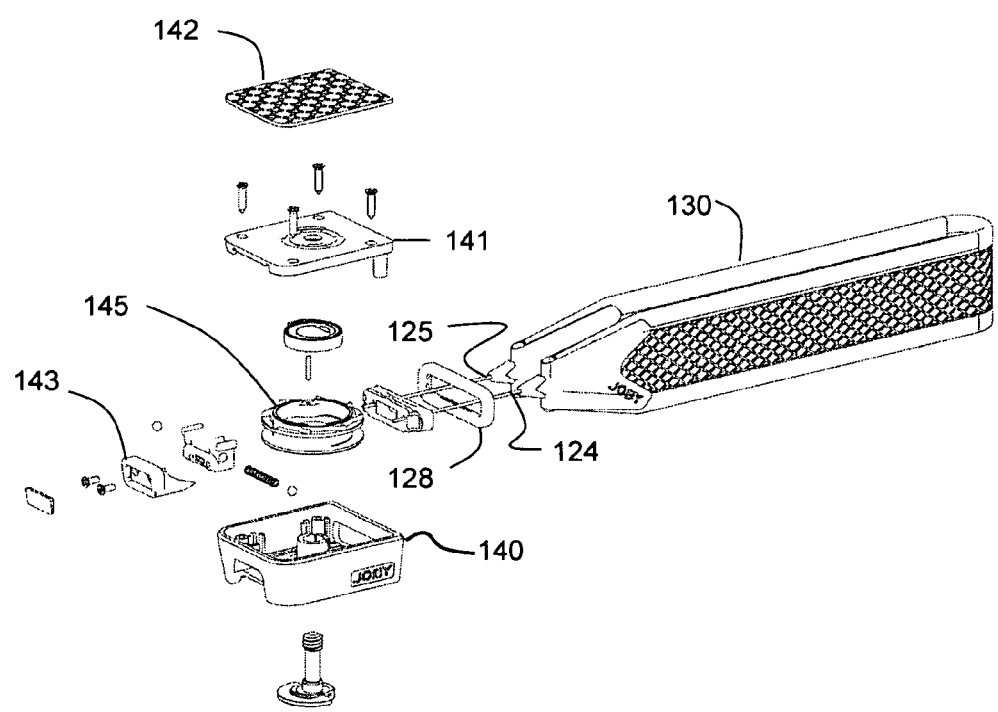
FIG. 13 is a perspective view of a camera strap system according to some embodiments of the present invention.

FIG. 13 illustrates an exploded view of a camera strap system 100 according to some embodiments of the present invention. The retractor body 140 has a top 141. Within the retractor body 140 is a cord spool 145 which may be locked into a chosen position, corresponding to a desired overall strap length. The cord spool 145 may have teeth on its top edge adapted to receive a portion of the lock 143 to implement a stoppage of the rotation of the cord spool 145. The lock 143 may be detents at both the open and closed ranges of motion so that the lock can be set into either a locked or unlocked position. A pad 142 on the top 141 allows for more secure fastening of the retractor base to the camera.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A camera strap and mounting system comprising:
a retractor base, said retractor base comprising a cord retractor; and
a strap assembly, said strap assembly comprising strap comprising a first end and a second end, wherein said first end of said strap couples to a first cord portion, and wherein said second end of said strap is coupled to a second cord portion, and wherein said first cord portion and said second cord portion enter said retractor base, and wherein said strap assembly is adapted to extend out from said retractor base from a first shorter length to a second longer length;
a cord retractor lock, said cord retractor lock adapted to lock said spring loaded spool at a plurality of positions; and
a slide, said slide removable mounted to said retractor base, said slide adapted to slide along said strap and cinch said strap into a loop,
wherein said cord retractor comprises a spring loaded spool adapted to reel in some of said first cord portion and some of said second cord portion,
and wherein said spring loaded spool is adapted to reel in said first cord portion and said second cord portion using spring force when said cord retractor lock is in an unlocked position.

2. A camera strap and mounting system comprising:
a retractor base, said retractor base comprising:
a cord retractor; and
a camera mounting screw on a top surface
a strap assembly, said strap assembly comprising strap comprising a first end and a second end, wherein said first end of said strap couples to a first cord portion, and wherein said second end of said strap is coupled to a second cord portion, and wherein said first cord portion and said second cord portion enter said retractor base, and wherein said strap assembly is adapted to extend out from said retractor base from a first shorter length to a second longer length;
a cord retractor lock, said cord retractor lock adapted to lock said spring loaded spool at a plurality of positions; and
a slide, said slide removable mounted to said retractor base, said slide adapted to slide along said strap and cinch said strap into a loop,
wherein said cord retractor comprises a spring loaded spool adapted to reel in some of said first cord portion and some of said second cord portion,
and wherein said spring loaded spool is adapted to reel in said first cord portion and said second cord portion using spring force when said cord retractor lock is in an unlocked position.

\* \* \* \* \*